(12) United States Patent
Schweizer et al.

(10) Patent No.: US 7,687,088 B2
(45) Date of Patent: Mar. 30, 2010

(54) PROTEIN ISOLATION PROCEDURES FOR REDUCING PHYTIC ACID

(75) Inventors: Martin Schweizer, Winnipeg (CA); Kevin I. Segall, Winnipeg (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 1258 days.

(21) Appl. No.: 11/123,185

(22) Filed: May 6, 2005

(65) Prior Publication Data

US 2005/0255226 A1    Nov. 17, 2005

Related U.S. Application Data

(60) Provisional application No. 60/568,680, filed on May 7, 2004, provisional application No. 60/605,145, filed on Aug. 30, 2004.

(51) Int. Cl.
*A61K 36/00* (2006.01)
(52) U.S. Cl. .................... 424/776; 424/725
(58) Field of Classification Search ............... None
See application file for complete search history.

(56) References Cited

U.S. PATENT DOCUMENTS

| | | | |
|---|---|---|---|
| 3,736,147 A | 5/1973 | Iacobucci | |
| 4,158,656 A * | 6/1979 | Jones et al. | 530/377 |
| 4,208,323 A * | 6/1980 | Murray et al. | 530/372 |
| 4,309,344 A * | 1/1982 | Walsh | 530/377 |
| 4,889,921 A * | 12/1989 | Diosady et al. | 530/377 |
| 5,844,086 A | 12/1998 | Murray | |
| 6,005,076 A * | 12/1999 | Murray | 530/377 |
| 6,146,669 A * | 11/2000 | Jones et al. | 426/53 |
| 6,303,178 B1 * | 10/2001 | Tsumura et al. | 426/654 |
| 2002/0155194 A1 * | 10/2002 | Mehansho et al. | 426/72 |
| 2003/0021884 A1 * | 1/2003 | Murray | 426/656 |
| 2003/0125526 A1 * | 7/2003 | Barker et al. | 530/370 |

FOREIGN PATENT DOCUMENTS

| | | |
|---|---|---|
| CA | 1100949 | 5/1981 |
| CA | 1139307 | 1/1983 |
| CA | 1246061 | 12/1988 |
| WO | WO 02/089597 A1 | 11/2002 |
| WO | WO 03/034836 A1 | 5/2003 |
| WO | WO 03/043439 A1 | 5/2003 |
| WO | WO 03/053157 A1 | 7/2003 |
| WO | WO 03/075673 A1 | 9/2003 |
| WO | WO 2004/000031 A1 | 12/2003 |

* cited by examiner

*Primary Examiner*—Christopher R. Tate
(74) *Attorney, Agent, or Firm*—Michael I. Stewart; Sim & McBurney (57) ABSTRACT

Oil seed protein isolates, in particular canola protein isolate, having a decreased phytic acid content is prepared by a procedure in which extraction of phytic acid from oil seed meal is inhibited during extraction of protein from the oil seed meal.

37 Claims, 2 Drawing Sheets

PROTEIN ISOLATION PROCEDURES FOR REDUCING PHYTIC ACID

REFERENCE TO RELATED APPLICATIONS

This application claims priority under 35 USC 119(e) from copending U.S. Patent Applications Nos. 60/568,680 filed May 7, 2004 and 60/605,145 filed Aug. 30, 2004.

FIELD OF INVENTION

This invention relates to the production of protein isolates, particularly canola protein isolate, from oil seed meals, in which there results a reduction in phytic acid content in the protein isolate.

BACKGROUND OF THE INVENTION

Canola protein isolates can be formed from canola oil seed meal. In copending U.S. patent application Ser. No. 10/137,391 filed May 3, 2002 (WO 02/089597), assigned to the assignee hereof and the disclosure of which is incorporated herein by reference, there is described a method of making canola protein isolates from canola oil seed meal, such isolates having at least 100 wt % protein content (N×6.25). The procedure involves a multiple step process comprising extracting canola oil seed meal using a salt solution, preferably an aqueous sodium chloride solution, separating the resulting aqueous protein solution from residual oil seed meal, increasing the protein concentration of the aqueous solution to at least about 200 g/L while maintaining the ionic strength substantially constant by using a selective membrane technique, diluting the resulting concentrated protein solution into chilled water to cause the formation of protein micelles, settling the protein micelles to form an amorphous, sticky, gelatinous gluten-like protein micellar mass (PMM), and recovering the protein micellar mass from supernatant, the PMM having a protein content of at least about 100 wt % as determined by Kjeldahl nitrogen (N)×6.25. As used herein, protein content is determined on a dry weight basis. The recovered PMM may be dried.

In one embodiment of the process described above and as specifically described in application Ser. No. 10/137,391, the supernatant from the PMM settling step is further processed to recover a protein isolate comprising dried protein from the wet PMM and supernatant. This procedure may be effected by initially concentrating the supernatant using ultrafiltration membranes, mixing the concentrated supernatant with the wet PMM and drying the mixture. The resulting canola protein isolate has a high purity of at least about 90 wt % of protein (N×6.25), preferably at least about 100 wt % protein (N×6.25).

In another embodiment of the process described above and as specifically described in application Ser. No. 10/137,391, the supernatant from the PMM settling step is processed to recover a protein isolate from the supernatant. This procedure may be effected by initially concentrating the supernatant using ultrafiltration membranes and drying the concentrate. The resulting canola protein isolate has a high purity of at least about 90 wt % protein (N×6.25), preferably at least about 100 wt % protein (N×6.25).

The procedures described in the aforementioned U.S. patent applications are essentially batch procedures. In copending U.S. patent application Ser. No. 10/298,678 filed Nov. 19, 2002 (WO 03/043439), assigned to the assignee hereof and the disclosures of which are incorporated herein by reference, there is described a continuous process for making canola protein isolates. In accordance therewith, canola oil seed meal is continuously mixed with a salt solution, preferably aqueous sodium chloride solution, the mixture is conveyed through a pipe while extracting protein from the canola oil seed meal to form an aqueous protein solution, the aqueous protein solution is continuously separated from residual canola oil seed meal, the aqueous protein solution is continuously conveyed through a selective membrane operation to increase the protein content of the aqueous protein solution to at least about 200 g/L while maintaining the ionic strength substantially constant, the resulting concentrated protein solution is continuously mixed with chilled water to cause the formation of protein micelles, and the protein micelles are continuously permitted to settle while the supernatant is continuously overflowed until the desired amount of PMM has accumulated in the settling vessel. The PMM is removed from the settling vessel and may be dried. The PMM has a protein content of at least about 90 wt % as determined by Kjeldahl nitrogen (N)×6.25, preferably at least about 100 wt % (N×6.25).

As described in the aforementioned U.S. patent application Ser. No. 10/137,391, the overflowed supernatant may be processed to recover canola protein isolate therefrom.

As described in copending U.S. patent application Ser. No. 10/413,371 filed Apr. 15, 2003 and corresponding PCT Publication No. WO 03/088760, assigned to the assignee hereof and the disclosures of which are incorporated herein by references, the PMM-derived canola protein isolate consists predominantly of the 7S protein along with some 12S protein while the supernatant-derived canola protein isolate consists predominantly of the 2S protein.

Oil seed meals, including canola oil seed meal, contain anti-nutritional factors, including phytic acid, often present in salt form as phytates. The term "phytic acid" used herein includes such salt forms. Depending on the oil seed, the content of phytic acid in oil seed meals may range from about 0.3 to about 10 wt %. Typically, canola oil seed meal contains about 2 to about 6 wt % of phytic acid.

Extraction of the canola oil seed meal with aqueous sodium chloride solution to form an aqueous protein solution solubilizes anti-nutritional factors including phytic acid from the oil seed meal, which results in the presence of phytic acid in the protein isolate recovered from the aqueous protein solution. As the quantity of phytic acid in the protein isolate increases, the digestibility of the protein isolate is adversely affected. The digestibility of the protein isolate is important in certain applications including aquaculture. It is desirable, therefore, to decrease the phytic acid content of the protein isolate for such applications.

Canola is also known as rapeseed or oil seed rape.

SUMMARY OF THE INVENTION

The present invention is concerned with procedures which lead to a reduced phytic acid content of protein isolates recovered from oil seed meals. We have found that, if the initial extraction of the oil seed meal, preferably canola oil seed meal, is effected under certain conditions, then there can be produced protein isolates of reduced phytic acid content and of improved nutritional value.

In one embodiment of the present invention, it has been found that, if the extraction of oil seed meal, preferably canola oil seed meal, with aqueous sodium chloride solution is effected at elevated temperature, then there results, after separation from residual oil seed meal, an aqueous protein solution which has a lesser phytic acid content than an aqueous canola protein solution produced by extraction effected at ambient temperature.

While not wishing to be bound by any theory, it is believed that phytic acid extracted from the oil seed meal at the elevated temperature precipitates from the resulting aqueous protein solution and is removed during filtration to separate the aqueous protein solution from residual oil seed meal. Further, the phytic acid may not be extracted into the aqueous protein solution due to an inverse solubility effect of phytic acid in aqueous sodium chloride solution with increasing temperature.

It has now also been found, in accordance with another embodiment of the present invention, that, if the sodium chloride preferably employed in the extraction step in the procedures described in the above-described patent applications, is replaced by calcium chloride, then the amount of phytic acid present in the aqueous protein solution separated from the spent canola oil seed meal is decreased.

While not wishing to be bound by any theory, it is believed that the calcium ions are complexed with the phytic acid by these procedures to form an insoluble precipitate which remains with the spent meal or is removed during clarification of the aqueous protein solution.

Accordingly, in one aspect of the present invention, there is provided a process of preparing a protein isolate, which comprises (a) extracting an oil seed meal to cause solubilization of protein in said oil seed meal to form an aqueous protein solution while inhibiting the extraction of phytic acid from the oil seed meal into the protein solution, (b) separating the aqueous protein solution from residual oil seed meal, (c) increasing the protein concentration of the aqueous protein solution to a concentration of at least about 50 g/L while maintaining the ionic strength substantially constant to provide a concentrated protein solution, (d) diluting said concentrated protein solution into chilled water having a temperature below about 15° C. to cause formation of protein micelles, (e) settling the protein micelles to form an armophous, sticky, gelatinous, gluten-like micellar mass, and, (f) separating the protein micellar mass from supernatant having a protein content of at least about 90 wt % (N×6.25) on a dry weight basis.

Further reduced amounts of phytic acid content in the aqueous protein solution from extraction of the oil seed meal may be achieved by combining the two embodiments described above, namely effecting an extraction using calcium chloride at an elevated temperature.

The canola protein isolates produced according to the process herein may be used in conventional applications of protein isolates, such as, protein fortification of processed foods, emulsification of oils, body formers in baked goods and foaming agents in products which entrap gases. In addition, the canola protein isolates may be formed into protein fibers, useful in meat analogs, may be used as an egg white substitute or extender in food products where egg white is used as a binder. The canola protein isolate may be used as nutritional supplements. Other uses of the canola protein isolate are in pet foods, animal feed, aquaculture and in industrial and cosmetic applications and in personal care products.

GENERAL DESCRIPTION OF INVENTION

The respective PMM-derived canola protein isolate and supernatant-derived canola protein isolate may be isolated from canola oil seed meal by either a batch process or a continuous process or a semi-continuous process as generally described in the aforementioned United States patent applications. Although the present invention is described hereinafter mainly with respect to canola, the present invention also is applicable to other oil seed meals where phytic acid is solubilized in the extraction step, including those of flax, hemp and soy.

The initial step of the process of providing the canola protein isolates involves solubilizing proteinaceous material from canola oil seed meal. The proteinaceous material recovered from canola seed meal may be the protein naturally occurring in canola seed or the proteinaceous material may be a protein modified by genetic manipulation but possessing characteristic hydrophobic and polar properties of the natural protein. The canola meal may be any canola meal resulting from the removal of canola oil from canola oil seed with varying levels of non-denatured protein, resulting, for example, from hot hexane extraction or cold oil extrusion methods. The removal of canola oil from canola oil seed usually may be effected as a separate operation from the protein isolate recovery procedure described herein.

Protein solubilization is effected to result in decreased quantities of phytic acid being present in the aqueous canola protein solution in comparison to the procedures described in the aforementioned US patent applications. The protein solubilization is effected using an aqueous salt solution, which may be aqueous sodium chloride solution or, in a preferred embodiment, an aqueous calcium chloride solution.

In order to have a decreased concentration of phytic acid in the aqueous canola protein solution resulting from the canola oil seed meal extraction, the extraction may be effected using aqueous calcium chloride solution over a range of temperatures or, where aqueous calcium chloride is not used, effecting the extraction at an elevated temperature rather than ambient temperature.

Such elevated temperature extraction may be effected at a temperature of about 45° to about 70° C. Preferably, such extraction is effected using an aqueous solution of sodium chloride at a temperature of about 550 to about 65° C.

The aqueous salt solution used in the protein extraction, when not calcium chloride and preferably sodium chloride, may have the ionic strength, pH and concentration of meal values discussed below for calcium chloride extraction.

Protein solubilization preferably is effected in accordance with one embodiment of the present invention by using a calcium chloride solution. The salt solution has an ionic strength of at least about 0.05, preferably at least about 0.1, to enable solubilization of significant quantities of protein to be effected. As the ionic strength of the calcium chloride solution increases, the degree of solubilization of protein in the oil seed meal initially increases until a maximum value is achieved. Any subsequent increase in ionic strength does not increase the total protein solubilized. The ionic strength of the calcium chloride solution which causes maximum protein solubilization varies depending on the oil seed meal chosen.

In view of the greater degree of dilution required for protein precipitation with increasing ionic strengths, it is usually preferred to utilize an ionic strength value less than about 0.8, and more preferably a value of about 0.1 to about 0.15.

In a batch process, the salt solubilization of the protein is effected at a temperature of at least about 5° C. and preferably up to about 35° C., preferably accompanied by agitation to decrease the solubilization time, which is usually about 10 to about 60 minutes. It is preferred to effect the solubilization to extract substantially as much protein from the oil seed meal as is practicable, so as to provide an overall high product yield.

The lower temperature limit of about 5° C. is chosen since solubilization is impractically slow below this temperature while the upper preferred temperature limit of about 35° C. is chosen since the process becomes uneconomic at higher temperature levels in a batch mode. However, higher temperatures may be desirable for the calcium chloride extraction in order to further decrease the phytic acid content of the aqueous protein solution, as discussed above.

In a continuous process, the extraction of the protein from the canola oil seed meal is carried out in any manner consistent with effecting a continuous extraction of protein from the canola oil seed meal. In one embodiment, the canola oil seed meal is continuously mixed with a calcium chloride solution and the mixture is conveyed through a pipe or conduit having a length and at a flow rate for a residence time sufficient to effect the desired extraction in accordance with the parameters described herein. In such continuous procedure, the salt solubilization step is effected rapidly, in a time of up to about 10 minutes, preferably to effect solubilization to extract substantially as much protein from the canola oil seed meal as is practicable. The solubilization in the continuous procedure preferably is effected at elevated temperatures, preferably above about 35° C., generally up to about 65° C. As noted earlier, elevated temperatures lead to lesser levels of phytic acid in the aqueous protein solution.

The aqueous calcium chloride solution and the canola oil seed meal have a natural pH of about 5 to about 6.8 to enable a protein isolate to be formed by the micellar route, as described in more detail below.

At and close to the limits of the pH range, protein isolate formation occurs only partly through the micelle route and in lower yields than attainable elsewhere in the pH range. For these reasons, pH values of about 5.3 to about 6.2 are preferred.

The pH of the salt solution may be adjusted to any desired value within the range of about 5 to about 6.8 for use in the extraction step by the use of any convenient acid, usually hydrochloric acid, or alkali, usually sodium hydroxide, as required.

The concentration of oil seed meal in the calcium chloride solution during the solubilization step may vary widely. Typical concentration values are about 5 to about 15% w/v.

An antioxidant may be present in the salt solution during at least part of the extraction step. The antioxidant may be any convenient antioxodiant, such as sodium sulfite or ascorbic acid. The quantity of antioxidant employed in the extraction step depends on the materials employed and may vary from about 0.01 to about 1 wt %, preferably about 0.05 wt %. The antioxidant serves to inhibit oxidation of phenolics present in the aqueous protein solution, which may adversely affect the colour of the final product.

The protein extraction step with the aqueous calcium chloride solution has the additional effect of solubilizing fats which may be present in the canola meal, which then results in the fats being present in the aqueous phase.

The protein solution resulting from the extraction step generally has a protein concentration of about 5 to about 40 g/L, preferably about 10 to about 30 g/L. The extraction of the protein from the canola oil seed meal using an aqueous calcium chloride solution results in the presence of phytic acid in the protein solution but at a significantly decreased level from that resulting from extraction of the canola oil seed meal using aqueous sodium chloride solution under the same extraction conditions.

The aqueous phase resulting from the extraction step then may be separated from the residual canola meal, in any convenient manner, such as by employing a decanter centrifuge, followed by disc centrifugation and/or filtration to remove residual meal. The separated residual meal may be dried for disposal.

The colour of the final canola protein isolate can be improved in terms of light colour and less intense yellow by the mixing of powdered activated carbon or other pigment adsorbing agent with the separated aqueous protein solution and subsequently removing the adsorbent, conveniently by filtration, to provide a protein solution. Diafiltration also may be used for pigment removal.

Such pigment removal step may be carried out under any convenient conditions, generally at the ambient temperature of the separated aqueous protein solution, employing any suitable pigment adsorbing agent. For powdered activated carbon, an amount of about 0.025% to about 5% w/v, preferably about 0.05% to about 2% w/v, is employed.

Where the canola seed meal contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution and on the concentrated aqueous protein solution discussed below. When the colour improvement step is carried out, such step may be effected after the first defatting step.

An alternative procedure is to extract the oil seed meal with the calcium chloride solution at a relatively high pH value above about 6.8, generally up to about 9.9. The pH of the calcium chloride solution, may be adjusted in pH to the desired alkaline value by the use of any convenient food-grade alkali, such as aqueous sodium hydroxide solution. Alternatively, the oil seed meal may be extracted with the calcium chloride solution at a relatively low pH below about pH 5, generally down to about pH 3. Where such alternative is employed, the aqueous phase resulting from the oil seed meal extraction step then is separated from the residual canola meal, in any convenient manner, such as by employing decanter centrifugation, followed by disc centrifugation and/or filtration to remove residual meal. The separated residual meal may be dried for disposal.

The aqueous protein solution resulting from the high or low pH extraction step then is pH adjusted to the range of about 5 to about 6.8, preferably about 5.3 to about 6.2, as discussed above, prior to further processing as discussed below. Such pH adjustment may be effected using any convenient acid, such as hydrochloric acid, or alkali, such as sodium hydroxide, as appropriate.

The aqueous protein solution then is concentrated to increase the protein concentration thereof while maintaining the ionic strength thereof substantially constant. Such concentration generally is effected to provide a concentrated protein solution having a protein concentration of at least about 50 g/L, preferably at least about 200 g/L, more preferably at least about 250 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 100,000 daltons, preferably about 5,000 to about 10,000 daltons, having regard to differing membrane materials and configurations, and, for continuous operation, dimensioned to permit the desired degree of concentration as the aqueous protein solution passes through the membranes.

The concentrated protein solution then may be subjected to a diafiltration step using an aqueous salt solution, which may be an aqueous sodium chloride solution or an aqueous calcium chloride solution, of the same molarity and pH as the extraction solution. Such diafiltration may be effected using from about 2 to about 20 volumes of diafiltration solution, preferably about 5 to about 10 volumes of diafiltration solution. In the diafiltration operation, further quantities of contaminants, including phenolics and visible colour are removed from the aqueous protein solution by passage through the membrane with the permeate. The diafiltration operation may be effected until no significant further quantities of phenolics and visible colour are present in the permeate. Such diafiltration may be effected using a membrane having a molecular weight cut-off in the range of about 3,000 to about 100,000 daltons, preferably about 5,000 to about 10,000 daltons, having regard to different membrane materials and configuration.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit oxidation of phenolics present in the concentrated canola protein isolate solution, which may adversely affect the colour of the final product.

The concentration step and the diafiltration step may be effected at any convenient temperature, generally about 20° to about 60° C., preferably about 20 to about 30° C., and for the period of time to effect the desired degree of concentration. The temperature and other conditions used to some degree depend upon the membrane equipment used to effect the concentration and the desired protein concentration of the solution.

The concentrating of the protein solution to the preferred concentration above about 200 g/L in this step not only increases the process yield to levels above about 40% in terms of the proportion of extracted protein which is recovered as dried protein isolate, preferably above about 80%, but also decreases the salt concentration of the final protein isolate after drying. The ability to control the salt concentration of the isolate is important in applications of the isolate where variations in salt concentrations affect the functional and sensory properties in a specific food application.

As is well known, ultrafiltration and similar selective membrane techniques permit low molecular weight species to pass therethrough while preventing higher molecular weight species from so doing. The low molecular weight species include not only the ionic species of the salt but also low molecular weight materials extracted from the source material, such as, carbohydrates, pigments and anti-nutritional factors, as well as any low molecular weight forms of the protein. The molecular weight cut-off of the membrane is usually chosen to ensure retention of a significant proportion of the protein in the solution, while permitting contaminants to pass through having regard to the different membrane materials and configurations.

The concentrated and optionally diafiltered protein solution may be subject to a further defatting operation, if required, as described in U.S. Pat. Nos. 5,844,086 and 6,005,076.

The concentrated and optionally diafiltered protein solution may be subject to a colour removal operation as an alternative to the colour removal operation described above. Powdered activated carbon may be used in this operation as well as granulated activated carbon (GAC). Another material which may be used as a colour adsorbing agent in this step is polyvinyl pyrrolidone.

The colour absorbing agent treatment step may be carried out under any convenient conditions, generally at the ambient temperature of the canola protein solution. For powdered activated carbon or granulated activated carbon, an amount of about 0.025% to about 5% w/v, preferably about 0.05% to about 2% w/v, may be used. Where polyvinylpyrrolidone is used as the colour adsorbing agent, an amount of about 0.5% to about 5% w/v, preferably about 2% to about 3% w/v, may be used. The colour adsorbing agent may be removed from the canola protein solution by any convenient means, such as by filtration.

The concentrated and optionally diafiltered protein solution resulting from the optional colour removal step may be subjected to pasteurization to kill any bacteria which may have been present in the original meal as a result of storage or otherwise and extracted from the meal into the canola protein isolate solution in the extraction step. Such pasteurization may be effected under any desired pasteurization conditions. Generally, the concentrated and optionally diafiltered protein solution is heated to a temperature of about 55° to about 70° C., preferably about 60° to about 65° C., for about 10 to about 15 minutes, preferably about 10 minutes. The pasteurized concentrated protein solution then may be cooled for further processing as described below, preferably to a temperature of about 25° to about 40° C.

Depending on the temperature employed in the concentration step and optional diafiltration step and whether or not a pasteurization step is effected, the concentrated protein solution may be warmed to a temperature of at least about 20°, and up to about 60° C., preferably about 25° to about 40° C., to decrease the viscosity of the concentrated protein solution to facilitate performance of the subsequent dilution step and micelle formation. The concentrated protein solution should not be heated beyond a temperature above which micelle formation does not occur on dilution by chilled water.

The concentrated protein solution resulting from the concentration step, and optional diafiltration step, optional colour removal step, optional pasteurization step and optional defatting step, then is diluted to effect micelle formation by mixing the concentrated protein solution with chilled water having the volume required to achieve the degree of dilution desired. Depending on the proportion of canola protein desired to be obtained by the micelle route and the proportion from the supernatant, the degree of dilution of the concentrated protein solution may be varied. With higher dilution levels, in general, a greater proportion of the canola protein remains in the aqueous phase.

When it is desired to provide the greatest proportion of the protein by the micelle route, the concentrated protein solution is diluted by about 15 fold or less, preferably about 10 fold or less.

The chilled water with which the concentrated protein solution is mixed has a temperature of less than about 15° C., generally about 3° to about 15° C., preferably less than about 10° C., since improved yields of protein isolate in the form of protein micellar mass are attained with these colder temperatures at the dilution factors used.

In a batch operation, the batch of concentrated protein solution is added to a static body of chilled water having the desired volume, as discussed above. The dilution of the concentrated protein solution and consequential decrease in ionic strength causes the formation of a cloud-like mass of highly associated protein molecules in the form of discrete protein droplets in micellar form. In the batch procedure, the protein micelles are allowed to settle in the body of chilled water to form an aggregated, coalesced, dense, amorphous sticky gluten-like protein micellar mass (PMM). The settling may be assisted, such as by centrifugation. Such induced settling decreases the liquid content of the protein micellar mass, thereby decreasing the moisture content generally from about 70% by weight to about 95% by weight to a value of generally about 50% by weight to about 80% by weight of the total micellar mass. Decreasing the moisture content of the micellar mass in this way also decreases the occluded salt content of the micellar mass, and hence the salt content of dried isolate.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution of the concentrated protein solution.

The mixing of the concentrated protein solution and the diluting water in the pipe initiates the formation of protein micelles and the mixture is continuously fed from the outlet from the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein micelles are allowed to settle in the settling vessel to form an aggregated, coalesced, dense, amorphous, sticky, gluten-like protein micellar mass (PMM) and the procedure is continued until a desired quantity of the PMM has accumulated in the bottom of the settling vessel, whereupon the accumulated PMM is removed from the settling vessel. In lieu of settling by sedimentation, the PMM may be separated continuously by centrifugation.

The combination of process parameters of concentrating of the protein solution to a preferred protein content of at least about 200 g/L and the use of a dilution factor less than about 15, result in higher yields, often significantly higher yields, in terms of recovery of protein in the form of protein micellar mass from the original meal extract, and much purer isolates in terms of protein content than achieved using any of the known prior art protein isolate forming procedures, as described, for example, in U.S. Pat. Nos. 5,844,086, 6,055,076 and 4,208,323.

By the utilization of a continuous process for the recovery of canola protein isolate as compared to the batch process, the initial protein extraction step can be significantly reduced in time for the same level of protein extraction and significantly higher temperatures can be employed in the extraction step. In addition, in a continuous operation, there is less chance of contamination than in a batch procedure, leading to higher product quality and the process can be carried out in more compact equipment.

The settled isolate is separated from the residual aqueous phase or supernatant, such as by decantation of the residual aqueous phase from the settled mass or by centrifugation. The PMM may be used in the wet form or may be dried, by any convenient technique, such as spray drying, freeze drying or vacuum drum drying, to a dry form. The dry PMM has a high protein content, in excess of about 90 wt % protein, preferably at least about 100 wt % protein (calculated as Kjeldahl N×6.25), and is substantially undenatured (as determined by differential scanning calorimetry).

As described in the aforementioned U.S. patent application Ser. No. 10/413,371, the PMM-derived canola protein isolate consists predominantly of a 7S protein and exhibits a protein profile which is:
  about 60 to about 90 wt % of 7S protein,
  about 1 to about 15 wt % of 12S protein, and
  0 to about 15 wt % of 2S protein,
  preferably
  about 88 to 95 wt % of 7S protein,
  about 1 to about 12 wt % of 12S protein, and
  0 to about 1 wt % of 2S protein.

The dry PMM isolated from fatty oil seed meal also has a low residual fat content, when the procedures of U.S. Pat. Nos. 5,844,086 and 6,005,076 are employed as necessary, which may be below about 1 wt %. The canola protein isolate contains decreased quantities of phytic acid, when compared to extraction of meal with aqueous sodium chloride solution under the same reaction conditions or at ambient temperature, and which preferably may be below about 1 wt %.

The supernatant from the PMM formation and settling step contains significant amounts of canola protein, not precipitated in the dilution step, and is processed to recover canola protein isolate therefrom. The supernatant from the dilution step, following removal of the PMM, is concentrated to increase the protein concentration thereof. Such concentration is effected using any convenient selective membrane technique, such as ultrafiltration, using membranes with a suitable molecular weight cut-off permitting low molecular weight species, including the salt and other non-proteinaceous low molecular weight materials extracted from the protein source material, to pass through the membrane, while retaining canola protein in the solution. Ultrafiltration membranes having a molecular weight cut-off of about 3,000 to 100,000 daltons, preferably about 5,000 to about 10,000 daltons, having regard to differing membrane materials and configuration, may be used. Concentration of the supernatant in this way also reduces the volume of liquid required to be dried to recover the protein. The supernatant generally is concentrated to a protein concentration of at least about 50 g/L, preferably about 100 to about 400 g/L, more preferably about 200 to about 300 g/L, prior to drying. Such concentration operation may be carried out in a batch mode or in a continuous operation, as described above for the protein solution concentration step.

The concentrated supernatant then may be subjected to a diafiltration step using water. Such diafiltration may be effected using from about 2 to about 20 volumes of diafiltration solution, preferably about 5 to about 10 volumes of diafiltration solution. In the diafiltration operation, further quantities of contaminants are removed from the aqueous supernatant by passage through the membrane with the permeate. The diafiltration operation may be effected until no significant further quantities of phenolics and visible colour are present in the permeate. Such diafiltration may be effected using the same membrane as for the concentration step. However, if desired, the diafiltration may be effected using a separate membrane, such as a membrane having a molecular weight cut-off in the range of about 3,000 to about 100,000 daltons, preferably about 5,000 to about 10,000 daltons, having regard to different membrane materials and configuration.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit oxidation of phenolics present in the concentrated canola protein isolate solution.

The concentrated and optionally diafiltered supernatant may be dried by any convenient technique, such as spray drying, freeze drying or vacuum drum drying, to a dry form to provide a further canola protein isolate. Such further canola protein isolate has a high protein content, in excess of about 90 wt %, preferably at least about 100 wt % protein (calculated as Kjeldahl N×6.25) and is substantially undenatured (as determined by differential scanning calorimetry).

As described in the aforementioned U.S. patent application Ser. No. 10/413,371, the canola protein isolate derived from the supernatant consists predominantly of 2S protein and exhibits a protein profile which is:
about 60 to about 95 wt % of 2S protein,
about 5 to about 40 wt % of 7S protein, and
0 to about 5 wt % of 12S protein,
preferably
about 70 to 75 wt % of 2S protein,
about 5 to about 30 wt % of 7S protein, and
0 to about 2 wt % of 12S protein.

The phytic acid content of the canola protein isolate is decreased when compared to extraction of the protein meal with aqueous sodium chloride solution under the same extraction conditions or at ambient temperature, and preferably may be less than about 1 wt %.

If desired, at least a portion of the wet PMM may be combined with at least a portion of the concentrated supernatant prior to drying the combined protein streams by any convenient technique to provide a combined canola protein isolate composition. The relative proportions of the proteinaceous materials mixed together may be chosen to provide a resulting canola protein isolate composition having a desired profile of 2S/7S/12S proteins. Alternatively, the dried protein isolates may be combined in any desired proportions to provide any desired specific 2S/7S/12S protein profiles in the mixture. The combined canola protein isolate composition has a high protein content, in excess of about 90 wt %, preferably at least about 100 wt %, (calculated as Kjeldahl N×6.25) and is substantially undenatured (as determined by differential scanning calorimetry).

In another alternative procedure, where a portion only of the concentrated supernatant is mixed with a part only of the PMM and the resulting mixture dried, the remainder of the concentrated supernatant may be dried as any of the remainder of the PMM. Further, dried PMM and dried supernatant also may be dry mixed in any desired relative proportions, as discussed above.

By operating in this manner, a number of canola protein isolates may be recovered, in the form of dried PMM, dried supernatant and dried mixtures of various proportions by weight of PMM-derived canola protein isolate and supernatant-derived canola protein isolate, generally from about 5:95 to about 95:5 by weight, which may be desirable for attaining differing functional and nutritional properties based on the differing proportions of 2S/7S/12S proteins in the compositions.

As an alternative to dilution of the concentrated protein solution into chilled water and processing of the resulting precipitate and supernatant as described above, protein may be recovered from the concentrated protein solution by dialyzing the concentrated protein solution to reduce the salt content thereof. The reduction of the salt content of the concentrated protein solution results in the formation of protein micelles in the dialysis tubing. Following dialysis, the protein micelles may be permitted to settle, collected and dried, as discussed above. The supernatant from the protein micelle settling step may be processed, as discussed above, to recover further protein therefrom. Alternatively, the contents of the dialysis tubing may be directly dried. The latter alternative procedure is useful where small laboratory scale quantities of protein are desired.

It has been observed that when the retentate from the concentration step from a calcium chloride extraction was diluted, the PMM settled poorly, resulting in more 7S protein being found to remain in the supernatant compared to a run with sodium chloride extraction under the same extraction conditions.

It is possible to use calcium chloride in the extraction step and, prior to dilution, then replace the calcium chloride by sodium chloride for diafiltration of the retentate with sodium chloride solution.

DESCRIPTION OF PREFERRED EMBODIMENTS

Figure 1:
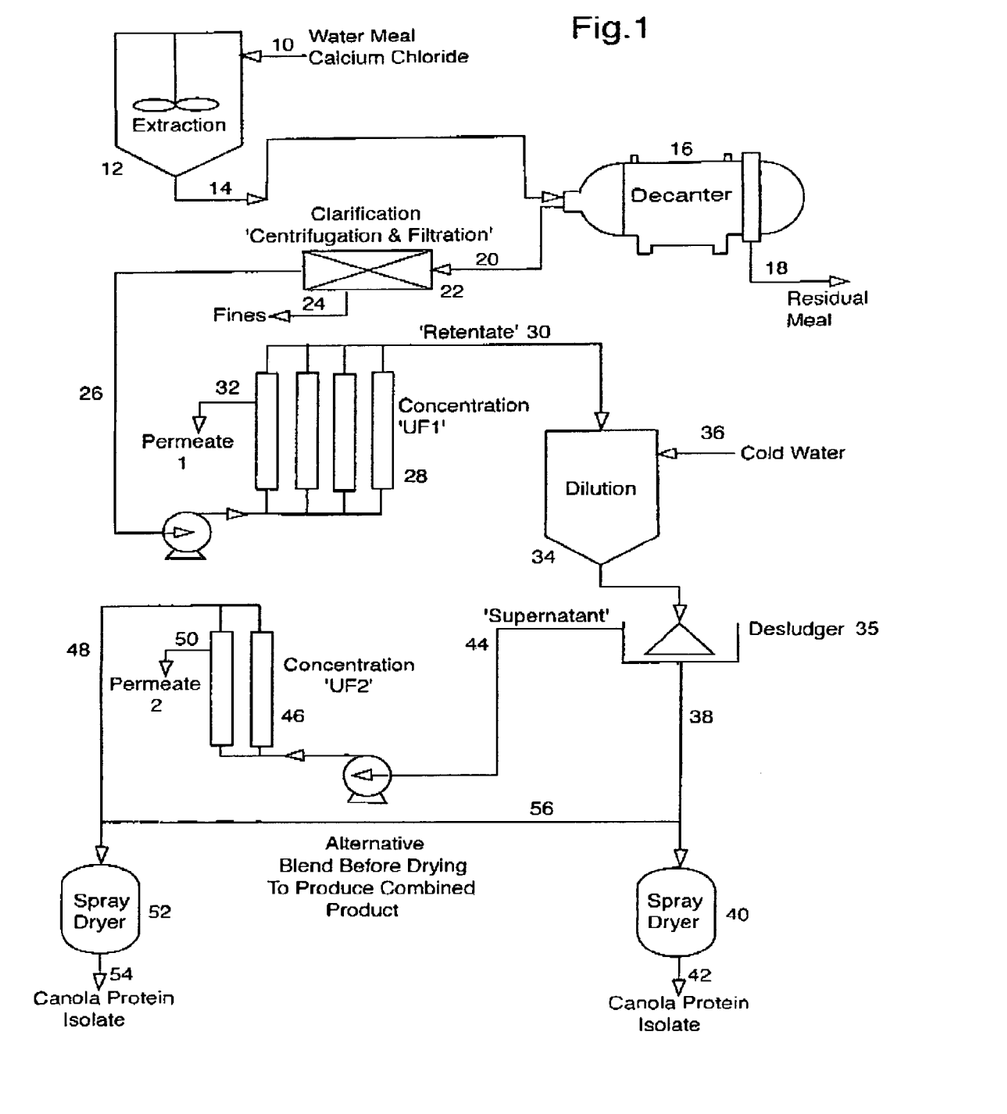
FIG. 1 is a schematic flow sheet of a procedure for producing canola protein isolates of differing protein profiles according to one embodiment of the invention.

Referring to FIG. 1, there is illustrated schematically a flow sheet of a batch process for the preparation of canola protein isolates having decreased phytic acid content. Canola oil seed meal and aqueous calcium chloride extraction medium are fed by line 10 to an extraction vessel 12 wherein the oil seed meal is extracted and an aqueous protein solution is formed. Alternatively, canola oil seed meal and aqueous sodium chloride solution are fed by line 10 to the extraction vessel for extraction at elevated temperature.

The slurry of aqueous protein solution and residual oil seed meal is passed by line 14 to a decanter centrifuge 16 for separation of the residual oil seed meal which is removed by line 18. The aqueous protein solution then is passed by line 20 to a clarification operation 22 wherein the aqueous protein solution is centrifuged and filtered to remove fines, which are recovered by line 24.

The clarified aqueous protein solution is pumped by line 26 through ultrafiltration membranes 28 to produce a concentrated protein solution as the retentate in line 30 with the permeate being recovered by line 32. The concentrated protein solution is passed into a precipitation vessel 34 containing cold water fed by line 36. Protein micellar mass formed in the precipitation vessel 34 passed through a desludger 35 and then by line 38 to a spray dryer 40 to provide dry canola protein isolate 42.

Supernatant from the desludger 35 is removed by line 44 and pumped through ultrafiltration membranes 46 to produce a concentrated protein solution as the retentate in line 48 with the permeate being removed by line 50. The concentrated protein solution is passed through a spray dryer 52 to provide further dry canola protein isolate 54.

As an alternative, the concentrated protein solution in line 48 may be passed by line 56 to mix with the protein micellar mass before the mixture then is dried in spray dryer 40.

Figure 2:
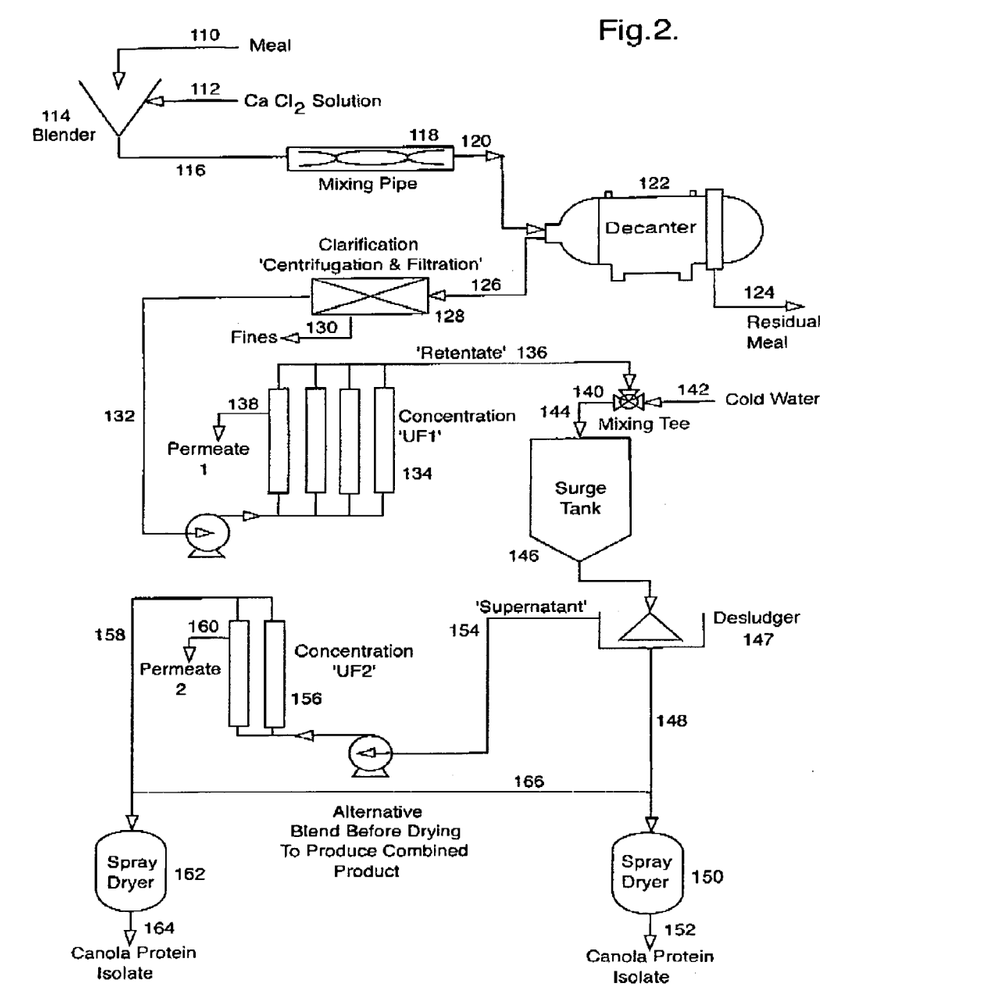
FIG. 2 is a schematic flow sheet of a continuous procedure for producing canola protein isolates of differing protein profiles according to another embodiment of the invention.

Referring to FIG. 2, there is illustrated schematically a flow sheet of a continuous process for the preparation of canola protein isolates having decreased phytic acid content. Canola oil seed meal and aqueous calcium chloride extraction medium are fed by lines 110 and 112 respectively to a blender 114 wherein the oil seed meal and aqueous extraction medium are mixed and the mixture is passed by line 116 to a mixing pipe 118. In the mixing pipe 118, the oil seed meal is extracted and an aqueous protein solution is formed. Alternatively, canola oil seed meal and aqueous sodium chloride solution are fed by lines 110 and 112 respectively to the blender 114 for extraction at elevated temperature in the mixing pipe 118. The slurry of aqueous protein solution and residual oilseed meal is passed by line 120 to a decanter centrifuge 122 for separation of the residual oil seed meal which is removed by line 124. The aqueous protein solution then is passed by line 126 to a clarification operation 128 wherein the aqueous protein solution is centrifuged and filtered to remove fines, which are recovered by line 130.

The clarified aqueous protein solution is pumped by line 132 through ultrafiltration membranes 134 sized to provide the desired degree of concentration of the aqueous protein solution to produce a concentrated protein solution as the retentate in line 136 with the permeate being recovered by line 138. The concentrated protein solution is passed into the inlet of a mixing tee 140, with cold water being fed thereto by line 142 in a volume sufficient to achieve the desired degree of dilution. The resulting solution is fed by line 144 to a surge tank 146 and then to desludger 147. Protein micellar mass is removed from the desludger by line 148 and passed through a spray dryer 150 to provide dry canola protein isolate 152.

Supernatant from the desludger 147 is removed by line 154 and pumped through ultrafiltration membranes 152 to produce a concentrated protein solution as the retentate in line 158 with the permeate being removed by line 160. The concentrated protein solution is passed through a spray dryer 162 to provide further dry canola protein isolate 164.

As an alternative, the concentrated protein solution in line 158 may be passed by line 166 to mix with the protein micellar mass before the mixture then is dried in spray dryer 150.

EXAMPLES

Example 1

This Example describes the preparation of canola protein isolates.

"a" kg of commercial canola oil seed meal was added to "b" L of extraction solution, which was either 0.1M NaCl or 0.075M $CaCl_2$, containing 0.05 wt % ascorbic acid at ambient temperature, agitated for 30 minutes to provide an aqueous protein solution having a protein content of "c" wt %. All protein contents were determined using a Leco FP528 Nitrogen Determinator. The residual canola meal was removed and the resulting protein solution was clarified by centrifugation and filtration to produce "d" L of filtered protein solution having a protein content of "e" % by weight.

A "f" L aliquot of the protein extract solution was reduced in volume to "g" L by concentration on a polyether sulfone (PES) membrane having a molecular weight cut-off of 100,000 daltons and then pasteurized at 60° C. for 10 minutes. The resulting pasteurized concentrated solution had a protein content of "h" % by weight.

The concentrated solution at "i" ° C. was diluted "j" into cold RO water having a temperature "q". A white cloud formed and was allowed to settle. The upper diluting water was removed and the precipitated, viscous, sticky mass (PMM) was recovered from the bottom of the vessel in a yield of "k" wt % of the filtered protein solution. The dried PMM-derived protein was found to have a protein content of "l" wt % (N×6.25) d.b. The product was given a designation "m (C300)".

The removed diluting water was reduced in volume by ultrafiltration using a PES membrane having a molecular weight cut-off of 100,000 daltons and then the concentrate was pasteurized at 60° C. for 10 minutes. The pasteurized concentrate, containing "n" % protein by weight was dried. With the additional protein recovered from the supernatant, the overall protein recovery of the filtered protein solution was "o". The dried supernatant-derived protein was found to have a protein content of "p" wt % (N×6.25) d.b. The product was given designation "m (C200)".

The parameters "a" to "q" and other features of the procedure are identified in the following Table I:

TABLE I

| | Parameter, units | Letter: m | Run 1 AL022-J07-03A | Run 2 AL022-J30-03A | Run 3 AL022-L03-03A |
|---|---|---|---|---|---|
| | Salt Solution for extract | | 0.1M NaCl | 0.075M $CaCl_2$ | 0.075M $CaCl_2$ |
| | kg meal | a | 15 | 15 | 15 |
| | Liters | b | 100 | 100 | 100 |
| | Protein % by wt. | c | 2.16% | 2.26% | 2.21% |
| | Clarified solution, L | d | 75 | 102 | 85 |
| | Filtered, protein % by wt. | e | 1.95% | 1.56% | 2.01% |
| | Aliquot protein sol'n L | f | 75 | 102 | 85 |
| | Reduced to, L | g | 3.5 | 4 | 3.5 |
| | Using: | | Flexstand | Flexstand | Flexstand |
| | MWCO membrane, both UFs | | PES 100,000 | PES 100,000 | PES 100,000 |
| | Protein % by wt. | h | 29.50% | 22.0% | 30.2% |
| | UF1 retentate temperature ° C. | i | 29.3 | 30.8 | 31.0 |
| | Dilution ratio | j | 1:10 | 1:10 | 1:10 |
| | Water at ° C. | q | 2.7 | 4.2 | 3 |
| | Wt % of filtered protein solution | k | 60.3% | 12.6% | 26.9% |
| C300 | % N × 6.25 dry basis | l | 103.8% | 102.9% | 104.9% |
| | Concentrated Supern. Protein % by wt. | n | 6.77% | 17.11% | 15.58% |
| | Wt % of filtered protein solution | o | 76.7% | 45.9% | 56.7% |
| C200 | wt % N × 6.25, dry basis | p | 95.9% | 106.6% | 104.7% |
| | Miscellaneous: | | | | |
| | Ascorbic acid used wt % | | 0.05%/50 grams | 0.05%/50 grams | 0.05%/50 grams |
| | Basket centrifuge: | | 400 then 600-mesh | 600-mesh | 600-mesh |
| | Filter press: | | 2-micron | 2-micron | 2-micron |
| | Pasteurized: | | Yes | Yes | Yes |

Example 2

This Example compares the phytic acid content of canola protein isolates prepared as described in Example 1.

The canola protein isolate samples, prepared as described in Example 1, were analyzed for phytic acid content by an ion-exchange/colourimetric method. The results obtained are set forth in the following Tables II and III:

TABLE II

| Sample | wt % Phytic Acid | Std Deviation: |
|---|---|---|
| AL022-J07-03A C300 w/NaCl | 1.55 | 0.08 |
| AL022-J07-03A C200 w/NaCl | 4.09 | 0.17 |
| AL022-J30-03A C300 w/CaCl$_2$ | 0.43 | 0.00 |
| AL022-J30-03A C200 w/CaCl$_2$ | 0.93 | 0.03 |

TABLE III

| Sample | wt % Phytic Acid | Std Deviation: |
|---|---|---|
| AL022-L03-03A C300 w/CaCl$_2$ | 0.85 | 0.06 |
| AL022-L03-03A C200 w/CaCl$_2$ | 0.34 | 0.06 |

As may be seen from this data, extraction of the canola oil seed meal using sodium chloride under the same extraction conditions resulted in a higher phytic acid content when compared to extractions made with calcium chloride. The difference in the phytate levels was not as significant between the C200 and the C300 product when CaCl$_2$ was used.

Example 3

This Example describes laboratory scale experiments comparing extraction of canola oil seed meal with sodium chloride and calcium chloride.

A series of laboratory-scale experiments were performed. In the experiments, 15 g of commercial canola oil seed meal were combined with 150 ml of extraction solvent to provide a 10% w/v extraction. The mixture was stirred for 30 min. using an orbital shaker operating at 220 rpm at ambient temperature. The extraction solvents were 0.05 M CaCl$_2$, 0.1 M NaCl and blends of 0.05M CaCl$_2$ and 0.1M NaCl, combined by volume, in the following proportions:

100% CaCl$_2$/0% NaCl
80% CaCl$_2$/20% NaCl
60% CaCl$_2$/40% NaCl
40% CaCl$_2$/60% NaCl
20% CaCl$_2$/80% NaCl
0% CaCl$_2$/100% NaCl

The extracts were centrifuged at 10,000 g for 10 min to separate spent meal from the extract. The centrifuged extracts were filtered through 25 µm filter paper. The filtrates were centrifuged at 10,000 g for 20 min. 80 ml of centrifuged filtrates were syringe filtered using a 0.45 µm filter for analysis and freeze drying.

The clarified extract samples were analyzed for protein content using a LECO FP528 Nitrogen Determinator and for phytic acid content by ion-exchange HPLC (internal) and an ion-exchange/colourimetric method (external). The samples were also analyzed for protein profile by size exclusion HPLC.

The phytic acid and protein levels for internal laboratory analysis and external independent analysis are set forth in the following Table IV.

TABLE IV

| Sample | % protein | Peak area phytic acid (internal) | % phytic acid (external) |
|---|---|---|---|
| 100% CaCl$_2$/0% NaCl | 1.83 | 40005 | 0.02 |
| 80% CaCl$_2$/20% NaCl | 1.74 | 26163 | 0.27 |
| 60% CaCl$_2$/40% NaCl | 1.66 | 164598 | 0.33 |
| 40% CaCl$_2$/60% NaCl | 1.62 | 198508 | 0.30 |
| 20% CaCl$_2$/80% NaCl | 1.54 | 256245 | 0.89 |
| 0% CaCl$_2$/100% NaCl | 1.54 | 362222 | 2.02 |

As may be seen, an increasing proportion of calcium chloride in the extraction solution resulted in lower levels of phytic acid in the clarified extract samples and higher levels of protein in the extract samples.

The protein profiles for the 12S, 7S and 2S proteins in the extract samples are set forth in the following Table V:

TABLE V

| Sample | % 12S | % 7S | % 2S |
|---|---|---|---|
| 100% CaCl$_2$/0% NaCl | 3.14 | 60.30 | 36.56 |
| 80% CaCl$_2$/20% NaCl | 1.91 | 61.23 | 36.86 |
| 60% CaCl$_2$/40% NaCl | 2.98 | 61.25 | 35.77 |
| 40% CaCl$_2$/60% NaCl | 1.96 | 62.63 | 35.41 |
| 20% CaCl$_2$/80% NaCl | 3.29 | 60.90 | 35.81 |
| 0% CaCl$_2$/100% NaCl | 3.19 | 58.83 | 37.97 |

While there are differences in the protein profiles of the various extract samples, they are not considered to be significant.

Example 4

This Example shows the effect of temperature of extraction medium on phytic acid content.

Samples of canola oil seed meal which had been desolventized at a temperature below 70° C. were extracted with aqueous sodium chloride solution at ambient temperature and 60° C.

15 g of canola oil seed meal with a protein content of 35.91 wt % and moisture content of 8.95% (determined after 3 hours in an oven at 100° C.) were added to 150 ml of 0.1 M aqueous sodium chloride solution and placed on a Lab-Line rotational shaker at 220 rpm at ambient temperature for 30 minutes.

The extract was centrifuged at 10,000 rpm using a Sorvall RC-5B centrifuge and GSA rotor to separate spent meal from the aqueous extract solution. The extract then was filtered through a fluted filter paper (25 µm) to remove any remaining particulate matter.

The filtrate was centrifuged for 20 minutes at 10,000 rpm and then syringed filtered (0.45 µm). The filtrate was freeze dried and samples subjected to phytic acid analysis.

The procedure then was repeated on another sample of the same canola oil seed meal, except that 15 g of the meal was added to 150 ml of 0.1 M NaCl, preheated to 60° C. and stirred for 5 minutes at 60° C. on a Thermolyne hotplate/stirrer.

Apparent protein extractabilities were similar for the meal samples extracted at ambient temperature (47.34%) and 60° C. (46.51%).

The samples derived from the canola oil seed meal were measured for phytic acid content and the results are set forth in the following Table VI:

TABLE VI

| Sample | Phytic Acid Content (wt %) |
|---|---|
| Ambient Extract | 1.85 |
| 60° C. Extract | 1.61 |

As may be seen from the results set forth in Table VI, extraction at 60° C. leads to a lower phytic acid content of the extract solution, which should result in less phytic acid in the recovered canola protein isolate.

SUMMARY OF DISCLOSURE

In summary of this disclosure, the present invention provides oil seed protein isolates of reduced phytic acid content by employing aqueous calcium chloride as the extraction medium and/or by employing elevated temperature in the extraction step. Modifications are possible within the scope of the invention.

What we claim is:

1. A process of preparing a protein isolate, which comprises:
   (a) extracting an oil seed meal using an aqueous calcium chloride solution at an elevated temperature of about 45° C. to about 70° to cause solubilization of protein in said oil seed meal to form an aqueous protein solution while inhibiting the extraction of phytic acid from the oil seed meal into the protein solution,
   (b) separating the aqueous protein solution from residual oil seed meal,
   (c) increasing the protein concentration of the aqueous protein solution to a concentration of at least about 50 g/L while maintaining the ionic strength substantially constant to provide a concentrated protein solution,
   (d) diluting said concentrated protein solution into chilled water having a temperature below about 15° C. to cause formation of protein micelles,
   (e) settling the protein micelles to form an amorphous, sticky, gelatinous, gluten-like micellar mass, and
   (f) separating the protein micellar mass from supernatant having a protein content of at least about 90 wt % (N×6.25) on a dry weight basis.

2. The process of claim 1 wherein said elevated temperature is about 55° to about 65° C.

3. The method of claim 1 wherein said oil seed meal is canola oil seed meal.

4. The method of claim 3 wherein said canola protein isolate has a protein content of at least 100 wt % (N×6.25).

5. The process of claim 3 which is carried out in a batch mode and wherein said aqueous calcium chloride solution having an ionic strength of at least about 0.05 and a pH of about 5 to about 6.8.

6. The process of claim 5 wherein said calcium chloride solution has an ionic strength of about 0.1 to about 0.6.

7. The process of claim 5 wherein said calcium chloride solution has a pH of about 5.3 to about 6.2.

8. The process of claim 5 wherein said extracting of said canola oil seed meal is effected with agitation of the aqueous calcium chloride solution for about 10 to about 30 minutes.

9. The process of claim 8 wherein the concentration of canals oil seed meal in said aqueous calcium chloride solution during the extraction step is about 5 to about 15 wt %.

10. The process of claim 5 wherein said protein solution resulting from the extraction step has a protein concentration of about 10 to about 30 g/L.

11. The process of claim 5 wherein said aqueous calcium chloride salt solution contains an antioxidant.

12. The process of claim 3 which is carried out on a continuous basis and wherein said extraction step is effected by:
   (i) continuously mixing canola oil seed meal with an aqueous calcium chloride solution having an ionic strength of at least about 0.5 and a pH of about 5 to about 8.8 at a temperature of about 45° C. to about 65° C., and
   (ii) continuously conveying said mixture through a pipe while extracting protein from the canola oil seed meal to form an aqueous protein solution having a protein content of about 5 to about 40 g/L in a period of time up to about 10 minutes.

13. The process of claim 12 wherein said calcium chloride solution has an ionic strength of about 0.1 to about 0.8.

14. The process of claim 12 wherein the calcium chloride solution has a pH of about 5.3 to about 6.2.

15. The process of claim 12 wherein the concentration of oil seed meal in said aqueous calcium chloride solution in said mixing step is about 5 to about 15% w/v.

16. The process of claim 12 wherein said temperature is at least about 35° C.

17. The process of claim 12 wherein said aqueous protein solution has a protein content of about 10 to about 30 g/L.

18. The process of claim 12 wherein said aqueous calcium chloride solution contains an antioxidant.

19. The process of claim 3 wherein following said separating of the aqueous protein solution from the residual canola seed meal, the aqueous protein solution is subjected to a pigment removal step.

20. The process of claim 19 wherein said pigment removal step is effected by diafiltration of the aqueous protein solution.

21. The process of claim 19 wherein said pigment removal step is effected by mixing a pigment adsorbing agent with the aqueous protein solution and subsequently removing the pigment adsorbing agent from the aqueous protein solution.

22. The process of claim 21 wherein the pigment adsorbing agent is powdered activated carbon.

23. The process of claim 3 wherein said concentration step is effected by ultrafiltration to produce a concentrated protein solution having a protein content of at least about 200 g/L.

24. The process of claim 3 wherein said concentrated protein solution is subjected to diafiltration.

25. The process of claim 24 wherein said diafiltration is effected using about 2 to about 20 volumes of diafiltration solution.

26. The process of claim 25 wherein said diafiltration is effected using about 5 to about 10 volumes of diafiltration solution.

27. The process of claim 24 wherein said at least part of the diafiltration step is effected in the presence of an antioxidant.

28. The process of claim 3 wherein said concentrated protein solution is subjected to a colour removal step.

29. The process of claim 28 wherein said colour removal step is effected using granulated activated carbon or polyvinylpyrrolidone.

30. The process of claim 3 wherein said concentrated protein solution is subjected to a pasteurization step.

31. The process of claim 30 wherein the pasteurization step is effected by heating the concentrated protein solution to a temperature of about 55° to about 70° C. for about 10 to about 15 minutes.

32. The process of claim 3 wherein additional canola protein isolate having a protein content of at least about 90 wt % is recovered from the supernatant.

33. The process of claim 32 wherein said additional canola protein isolate has a protein content of at least about 100 wt %.

34. The process of claim 32 wherein said additional protein isolate is obtained by concentrating the supernatant to a protein concentration of about 100 to about 400 g/L and then drying the concentrated solution.

35. The process of claim 34 wherein said supernatant is concentrated to a protein concentration of about 200 to about 300 g/L.

36. The process of claim 34 wherein the concentrated protein solution is subjected to diafiltration.

37. The process of claim 36 wherein an antioxidant is present during said diafiltration step.

\* \* \* \* \*